United States Patent
Spencer (10) Patent No.: US 7,128,777 B2
(45) Date of Patent: Oct. 31, 2006

(54) METHODS AND SYSTEMS FOR SELECTIVELY SEPARATING CO₂ FROM A MULTICOMPONENT GASEOUS STREAM TO PRODUCE A HIGH PRESSURE CO₂ PRODUCT

(76) Inventor: Dwain F. Spencer, 13474 Tierra Heights Rd., Redding, CA (US) 96003-8011

( * ) Notice: Subject to any disclaimer, the term of this patent is extended or adjusted under 35 U.S.C. 154(b) by 58 days.

(21) Appl. No.: 10/869,457

(22) Filed: Jun. 15, 2004

(65) Prior Publication Data

US 2005/0274258 A1   Dec. 15, 2005

(51) Int. Cl.
   *B01D 53/14*   (2006.01)
   *B01D 53/78*   (2006.01)

(52) U.S. Cl. .................... 95/195; 95/236; 423/220

(58) Field of Classification Search ............. 95/152, 95/153, 195, 205, 236; 423/220, 437.1
See application file for complete search history.

(56) References Cited

U.S. PATENT DOCUMENTS

| | | | |
|---|---|---|---|
| 5,700,311 A | 12/1997 | Spencer | |
| 6,028,234 A * | 2/2000 | Heinemann et al. | 585/15 |
| 6,090,186 A | 7/2000 | Spencer | |
| 6,106,595 A | 8/2000 | Spencer | |
| 6,235,091 B1 | 5/2001 | Spencer | |
| 6,235,092 B1 | 5/2001 | Spencer | |
| 6,352,576 B1 | 3/2002 | Spencer et al. | |
| 6,602,326 B1 * | 8/2003 | Lee et al. | 95/153 |
| 6,797,039 B1 * | 9/2004 | Spencer | 95/153 |

* cited by examiner

*Primary Examiner*—Frank M. Lawrence
(74) *Attorney, Agent, or Firm*—Bret E. Field; Bozicevic, Field & Francis LLP (57) ABSTRACT

Methods are provided for the selective removal of CO₂ from a multicomponent gaseous stream to provide a CO₂ depleted gaseous stream. In practicing the subject methods, an initial multicomponent gaseous stream is contacted with an aqueous fluid under conditions of selective CO₂ clathrate formation to produce a CO₂ clathrate slurry and CO₂ depleted gaseous stream. A feature of the subject methods is that the CO₂ clathrate slurry is then compressed to high pressure to produce a high-pressure CO₂ product. Also provided are systems that find use in practicing the subject methods. The subject methods and systems find use in a variety of applications where it is desired to selectively remove CO₂ from a multicomponent gaseous stream.

21 Claims, 2 Drawing Sheets

METHODS AND SYSTEMS FOR SELECTIVELY SEPARATING $CO_2$ FROM A MULTICOMPONENT GASEOUS STREAM TO PRODUCE A HIGH PRESSURE $CO_2$ PRODUCT

FIELD OF THE INVENTION

The field of this invention is selective absorption of $CO_2$ gas.

INTRODUCTION

In many applications where mixtures of two or more gaseous components are present, it is often desirable to selectively remove one or more of the component gases from the gaseous stream. Of increasing interest in a variety of industrial applications, including power generation, chemical synthesis, natural gas upgrading, and conversion of methane hydrates to hydrogen and $CO_2$, is the selective removal of $CO_2$ from multicomponent gaseous streams.

As man made $CO_2$ is increasingly viewed as a pollutant, an area in which it is desirable to separate $CO_2$ from a multicomponent gaseous stream is in the area of pollution control. Emissions from industrial facilities, such as manufacturing and power generation facilities, often include $CO_2$. In such instances, it is often desirable to at least reduce the $CO_2$ concentration of the emissions. The $CO_2$ may be removed prior to combustion in some cases and post combustion in others.

A variety of processes have been developed for removing or isolating a particular gaseous component from a multi-component gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated.

Gas absorption finds widespread use in the separation of $CO_2$ from multicomponent gaseous streams. In $CO_2$ gas absorption processes that currently find use, the following steps are employed: (1) absorption of $CO_2$ from the gaseous stream by a host solvent, e.g., monoethanolamine; (2) removal of $CO_2$ from the host solvent, e.g., by steam stripping; and (3) compression of the stripped $CO_2$ for disposal, e.g., by sequestration through deposition in the deep ocean or ground aquifers.

Although these processes have proved successful for the selective removal of $CO_2$ from a multicomponent gaseous stream, they are energy intensive and expensive in terms of cost per ton of $CO_2$ removed or sequestered.

Accordingly, there is continued interest in the development of less expensive and/or energy intensive processes for the selective removal of $CO_2$ from multicomponent gaseous streams. Of particular interest would be the development of an efficient process which could provide for efficient $CO_2$ separation at low to moderate $CO_2$ partial pressure and produce a high-pressure $CO_2$ product gas stream.

Relevant Literature

U.S. patents of interest include U.S. Pat. Nos. 5,700,311; 6,090,186; 6,106,595; 6,235,091; 6,235,092 and 6,352,576.

SUMMARY OF THE INVENTION

Methods are provided for the selective removal of $CO_2$ from a multicomponent gaseous stream to provide a $CO_2$ depleted gaseous stream. In practicing the subject methods, an initial multicomponent gaseous stream is contacted with an aqueous fluid under conditions of selective $CO_2$ clathrate formation to produce a $CO_2$ clathrate slurry and $CO_2$ depleted gaseous stream. A feature of the subject methods is that the $CO_2$ clathrate slurry is then pumped to high pressure and decomposed to produce a high-pressure $CO_2$ product gas stream. Also provided are systems that find use in practicing the subject methods. The subject methods and systems find use in a variety of applications where it is desired to selectively remove $CO_2$ from a multicomponent gaseous stream.

DETAILED DESCRIPTION OF THE INVENTION

Methods are provided for the selective removal of $CO_2$ from a multicomponent gaseous stream to provide a $CO_2$ depleted gaseous stream. In practicing the subject methods, an initial multicomponent gaseous stream is contacted with an aqueous fluid under conditions of selective $CO_2$ clathrate formation to produce a $CO_2$ clathrate slurry and $CO_2$ depleted gaseous stream. A feature of the subject methods is that the $CO_2$ clathrate slurry is then pumped to high pressure and then decomposed to produce a high-pressure $CO_2$ product gas stream, e.g. for subsequent use or sequestration. Also provided are systems that find use in practicing the subject methods. The subject methods and systems find use in a variety of applications where it is desired to selectively remove $CO_2$ from a multicomponent gaseous stream.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

All publications mentioned herein are incorporated herein by reference for the purpose of describing and disclosing the elements that are described in the publications which might be used in connection with the presently described invention.

In further describing the subject invention, representative embodiments of the subject methods are described first in greater detail, followed by a more detailed review of representative embodiments of systems of the subject invention.

Methods

As summarized above, the subject invention provides a method of selectively removing $CO_2$ from multicomponent gaseous stream. A feature of the subject methods is that they provide for resource efficient separation of the $CO_2$ from the multicomponent gaseous stream at low pressures and production of a high-pressure $CO_2$ product from the separated $CO_2$. In representative embodiments of the invention, the high-pressure $CO_2$ product is a product having a pressure that is at least about 10 times higher, such as at least about 30 times higher, or even higher than the pressure at which the $CO_2$ separation from the multicomponent gaseous stream occurred. Specific representative pressure ranges for the $CO_2$ separation step and product of the subject process are provided below.

The first step of the subject methods is to contact a multicomponent gaseous stream with an aqueous fluid under conditions sufficient for $CO_2$ hydrate formation to occur. The multicomponent gaseous stream may be any of a variety of different types of gaseous streams, depending on the particular application in which the subject application is being employed. As such, a variety of multicomponent gaseous streams are amenable to treatment according to the subject methods. Multicomponent gaseous streams from which $CO_2$ may be separated according to the subject invention will comprise at least two different gaseous components and may comprise five or more different gaseous components, where at least one of the gaseous components will be $CO_2$, where the other component or components may be one or more of $N_2$, $O_2$, $H_2O$, $CH_4$, $H_2$, $CO$ and the like, as well as one or more trace gases, e.g., Argon, $H_2S$, $SO_2$, etc.

The total pressure of the multicomponent gaseous stream when contacted with the aqueous fluid in the first hydrate formation step of the subject methods will generally be at least about 1 atm, usually at least about 2 atm and may be as high as 10 atm or higher, but in certain representative embodiments will not be higher than about 9 atm or even about 8 atm, such that the pressure in certain representative embodiments ranges from about 1 to about 10 atm, such as from about 2 to about 9 atm, including from about 2 to about 8 atm. The mole fraction of $CO_2$ in the multicomponent gaseous streams amenable to treatment according to the subject invention may range from about 0.05 to 0.40, such as from about 0.07 to 0.30, including from about 0.10 to 0.20. The partial pressure of $CO_2$ in the multicomponent gaseous stream need not be high, and may be as low as about 0.05 atm, such as about 0.07 atm, including as low as about 0.10 atm.

In certain embodiments, the multicomponent gaseous stream may have been preprocessed from its initial state prior to this first hydrate formation step of the subject methods. For example, in certain embodiments the pressure and/or temperature of the multicomponent gaseous stream may have been modulated, e.g., raised or lowered, as desired and depending on the initial state of the multicomponent gaseous stream. For example, where the multicomponent gaseous stream is flue gas, which may have a temperature of about 150° F. and a pressure of about 1 to 1.5 atm, the temperature of the gas may be lowered and/or the pressure of the gas may be raised to values desirable for hydrate formation. The initial gas source may also be separated into one or more smaller streams, as desired.

In the first hydrate formation step of the present methods in which the multicomponent gas is contacted with an aqueous fluid under hydrate formation reaction conditions, any convenient aqueous fluid may be employed. Aqueous fluids of interest include, but are not limited to, water, either pure water or salt water, $CO_2$ nucleated water as described in U.S. Pat. No. 5,700,311 and U.S. Pat. Nos. 6,090,186 and 6,106,595; the disclosures of which are herein incorporated by reference, and the like.

In certain embodiments of interest, the aqueous fluid may include a $CO_2$ hydrate promoter. In certain embodiments, the aqueous fluid with which the multicomponent gaseous stream is contacted may include a $CO_2$ hydrate promoter, as described in U.S. Pat. No. 6,352,576, the disclosure of which is herein incorporated by reference. In certain embodiments, the $CO_2$ hydrate promoters are proton donors, such as water-soluble halogenated hydrocarbons, and the like. Water soluble halogenated hydrocarbons of interest are generally those having from 1 to 5, usually 1 to 4 and more usually 1 to 2 carbon atoms, where the halogen moiety may be F, Cl, Br, I etc. Specific halogenated hydrocarbons of interest include chloroform, ethylene chloride, carbon tetrachloride, and the like. Where the $CO_2$ hydrate promoter is ethylene chloride, it is generally dissolved in the nucleated water in an amount ranging from about 100 to 2500 ppm, usually from about 500 to 2000 ppm and more usually from about 1000 to 1800 ppm. Where the $CO_2$ hydrate promoter is chloroform, it is generally present in the nucleated water in an amount ranging from about 100 to 2500 ppm, usually from about 500 to 2000 ppm and more usually from about 1000 to 1800 ppm. Where the $CO_2$ hydrate promoter is carbon tetrachloride, it is generally present in the nucleated water in an amount ranging from about 50 to 200 ppm, usually from about 80 to 160 ppm and more usually from about 100 to 120 ppm.

Also of particular interest as $CO_2$ promoters are the organic salts, particularly alkyl ammonium, sulfonium and phosphonium salts. The alkyl ammonium salts are compounds with cations of the generic formula:

$$R_4N^+$$

where R usually consists of hydrocarbon elements of the formula:

$$nC_aH_{2a+1}$$

n=1, 2, 3 . . . a=1, 2, 3

For example, R may be methyl or normal (linear) $C_4H_9$, but may also be iso-$C_3H_{11}$. Of the four groups attached to the nitrogen, they need not all be of the same chemical composition (i.e. one may be methyl while another may be ethyl etc.). The anionic portion of the salt may consist of simple ions such as: F—, HCOO—, OH—, Br—, Cl—, $NO_3$—, etc, but may also be ions such as normal (linear): $nC_aH_{2a+1}$COO— or iso-$nC_aH_{2a+1}$COO—.

The sulfonium salts usually are compounds with cations of the generic formula:

$$R_3S^+$$

where again R may be any of the possibilities cited above. Similarly, for the sulfonium salts, all three R=s need not be of the same chemical composition. The anion for the sulfonium salts is usually F—. The phosphonium salts generally have the generic formula:

$$R_4P^+$$

for the cations with the same choices for the four R groups as described above. The anions may be anions as described above.

This class of akyl-onium salts readily form hydrate structures involving encagement of the salt in Structure II or H class of polyhedral water cages. (In many cases the anion actually is part of the cage structure.) The hydrates of these salts form at or below atmospheric pressure and are stable well above the freezing point of water (where some melting points exceed 20° C.).

The above described "onium" salts vary widely in the number of water molecules per salt molecule (i.e. the hydration number). For example, the hydration number may be as low as 4 (for hydroxide salts) and as high as 50 (for formate salts), but will typically range from about 18 to 38 (e.g. for flouride and oxalate salts).

The concentration to be used depends on which embodiment of the invention is employed. When used as a means for nucleating water, concentrations are similar to the gaseous promoters, usually in the range of 100 to 150 ppm. However, when used to form mixed hydrates, the promoter salt concentration may be substantially higher depending on the final partial pressure of $CO_2$ that is sought. For the "onium" salts, this could be as high as about 30 wt. percent, but is more typically in the range of from about 5 to about 25% by wt.

When used to alter the solubility of charged gases, the promoter structure away from the charged end is chosen to be chemically similar to the gaseous component whose solubility is to be decreased and chosen to have an affinity for gas molecules whose solubility is to be increased. Since alteration of gaseous solubility would typically be used in conjunction with the other embodiments (e.g. formation of mixed hydrates, raising of T, or lowering of P) the concentrations could be as high as about 30 wt. %, but in representative embodiments would be about 5 to about 25 wt. %.

The R-groups on the cations are typically chosen so as to lower the solubility of compounds where incorporation into the $CO_2$ or mixed hydrate is undesirable. For example, R=s may be chosen as hydrocarbon moieties which lower the solubility of methane in water for natural gas upgrading gas applications. In certain embodiments, the R groups are chosen so that solubility of gases, whose incorporation into the hydrate is desirable, is increased. An example would be R groups with a mild chemical affinity for the solvated gas of interest, e.g. $CO_2$.

In representative embodiments, the multicomponent gaseous stream to be treated according to the subject methods is contacted with water that may contain $CO_2$ hydrate precursors or hydrate precursors of the promoter compounds. In this process, the nucleated water will include a $CO_2$ hydrate promoter, as described above. The $CO_2$ nucleated water employed in these embodiments of the subject invention comprises dissolved $CO_2$ in the form of $CO_2$ hydrate precursors, where the precursors are in metastable form. These precursors may be composite for mixed hydrates containing both $CO_2$ and promoter molecules The mole fraction of $CO_2$ in the $CO_2$ nucleated water ranges from about 0.01 to 0.10, usually from about 0.02 to 0.08, more usually from about 0.02 to 0.03. The temperature of the $CO_2$ nucleated water may range from about −5 to about 30° C., such as from about 7 to about 25° C., and including from about 10 to about 20° C.

The water that is used to produce the nucleated water may be obtained from any convenient source, where convenient sources include the deep ocean, deep fresh water aquifers, power-plant cooling ponds, and the like, and cooled to the required reactor conditions. In certain embodiments, the nucleated water may be recycled from a downstream source, such a clathrate slurry heat exchanger/decomposition source (as described in greater detail below) where such recycled nucleated water may be supplemented as necessary with additional water, which water may or may not be newly synthesized nucleated water as described above and may, or may not, contain dissolved $CO_2$ hydrate promoters.

The amount of $CO_2$ that is dissolved in the water is determined in view of the desired $CO_2$ mole fraction of the $CO_2$ nucleated water to be contacted with the gaseous stream. One means of obtaining $CO_2$ nucleated water having relatively high mole fractions of $CO_2$ is to produce a slurry of $CO_2$ clathrates and then decompose the clathrates by lowering the pressure and/or raising the temperature of the slurry to release $CO_2$ and regenerate a partially nucleated water stream. Generally, nucleated water having higher mole fractions of $CO_2$ are desired because it more readily accepts $CO_2$ absorption or adsorption and accelerates the formation of other hydrate compounds. By high mole fraction of $CO_2$ is meant a mole fraction of about 0.02 to 0.04, usually from about 0.025 to 0.035.

The production of $CO_2$ nucleated water may conveniently be carried out in a nucleation reactor. The reactor may be packed with a variety of materials, where particular materials of interest are those which promote the formation of $CO_2$ nucleated water with hydrate precursors and include: stainless steel rings, carbon steel rings, metal oxides and the like, to promote gas-liquid contact and catalyze hydrate formation. To ensure that the optimal temperature is maintained in the nucleation reactor, active coolant means may be employed. Any convenient coolant means may be used, where the coolant means will typically comprise a coolant medium housed in a container which contacts the reactor, preferably with a large surface area of contact, such as coils around and/or within the reactor or at least a portion thereof, such as the tail tube of the reactor. Coolant materials or media of interest include liquid ammonia, HCFCs, and the like, where a particular coolant material of interest is ammonia, where the ammonia is evaporated at a temperature of from about −10 to about 10° C. The surface of the cooling coils, or a portion thereof, may be coated with a catalyst material, such as an oxide of aluminum, iron, chromium, titanium, and the like, to accelerate $CO_2$ hydrate precursor formation. Additionally, hydrate crystal seeding or a small (1–3 atm) pressure swing may be utilized to enhance hydrate precursor formation.

In certain embodiments of the subject invention, the $CO_2$ nucleated water is prepared by contacting water (e.g. fresh or salt water) with high pressure, substantially pure $CO_2$ gas provided from an external high pressure $CO_2$ gas source. In this embodiment, the water is contacted with substantially pure $CO_2$ gas that is at a pressure that is about equal to or slightly above the initial $CO_2$ partial pressure in the multicomponent gaseous stream pressure. As such, the pressure of the substantially pure $CO_2$ gas typically ranges in many embodiments from about 5 to 7 about atm above the multicomponent gaseous stream pressure ($CO_2$ overpressure stimulation of hydrate precursor and hydrate formation). By substantially pure is meant that the $CO_2$ gas is at least 95% pure, usually at least 99% pure and more usually at least 99.9% pure. Advantages realized in this embodiment include the production of $CO_2$ saturated water that comprises high amounts of dissolved $CO_2$, e.g. amounts (mole fractions) ranging from about 0.02 to 0.04, usually from about 0.025 to 0.035. Additional advantages include the use of relatively smaller nucleation reactors (as compared to nucleation reactors employed in other embodiments of the subject invention) and the production of more $CO_2$ selective nucleated water. In those embodiments where small nucleation reactors are employed, it may be desirable to batch produce the $CO_2$ saturated water, e.g., by producing the total requisite amount of $CO_2$ saturated water in portions and storing the saturated water in a high pressure reservoir. The $CO_2$ saturated water is readily converted to nucleated water, i.e. water laden with $CO_2$ hydrate precursors, using any convenient means, e.g., by temperature cycling, contact with catalysts, pressure cycling, etc. This pre-structuring of the hydrate formation water not only increases the kinetics of hydrate formation, but also reduces the exothermic energy release in the $CO_2$ hydrate reactor. This, in turn, reduces the cooling demands of the process and increases overall process efficiency.

While the above protocols may be employed to prepare the initial nucleate water, in certain embodiments of interest, following the initial preparation of the nucleated water, additional nucleated water is obtained from the aqueous byproduct produced at the end of the process, such that recycled aqueous byproduct is employed as the nucleated water, as described in greater detail below.

As mentioned above, in the first step of the subject methods, the multicomponent gaseous stream is contacted with the aqueous fluid, e.g., $CO_2$ nucleated water with hydrate promoters, under conditions of $CO_2$ clathrate formation, preferably under conditions of selective $CO_2$ clathrate formation. The aqueous fluid may be contacted with the gaseous stream using any convenient means. Preferred means of contacting the aqueous fluid with the gaseous stream are those means that provide for efficient removal, e.g., by absorption or adsorption which enhances hydrate formation, of the $CO_2$ from the gas through solvation of the gaseous $CO_2$ within the liquid phase or direct contact of the $CO_2$ gas with unfilled hydrate cages, which extract the $CO_2$ from the multicomponent gaseous stream. Means that may be employed include concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of fluidic Venturi reactor, sparger reactor, gas filter, spray, tray, or packed column reactors, and the like, as may be convenient.

Generally, contact between the multicomponent gaseous stream and the aqueous fluid is carried out in a hydrate or clathrate formation reactor. The reactor may be fabricated from a variety of materials, where particular materials of interest are those that catalyze the formation of $CO_2$ clathrates or hydrates and include: stainless steel, carbon steel, and the like. The reactor surface, or a portion thereof, may be coated with a catalyst material, such as an oxide of aluminum, iron, chromium, titanium, and the like, to accelerate $CO_2$ hydrate formation. To ensure that the optimal temperature is maintained in the hydrate formation reactor, active coolant means may be employed. Any convenient coolant means may be used, where the coolant means will typically comprise a coolant medium housed in a container which contacts the reactor, preferably with a large surface area of contact, such as coils around or within the reactor or at least a portion thereof, such as the exit plenum and tail tube of the reactor. Coolant materials or media of interest include ammonia, HCFCs and the like, where a particular coolant material of interest is ammonia, where the ammonia is maintained at a temperature of from about −10 to 10° C. Where the reactor includes gas injectors as the means for achieving contact to produce clathrates, the reactor may include 1 or a plurality of such injectors. In such reactors, the number of injectors will range from 1 to about 20 or more, where multiple injectors provide for greater throughput and thus greater clathrate production. Specific examples of various reactors that may be employed for clathrate production are provided in U.S. Pat. No. 6,090,186, the disclosure of which is herein incorporated by reference. In certain embodiments, the clathrate formation reactor is a finned tubular reactor, as described in greater detail below and in U.S. Pat. No. 6,797,039; the disclosure of which is herein incorporated by reference.

In certain embodiments, the hydrate formation reactor has a heat transfer surface area sufficient to transfer substantially all of said heat of formation energy produced by clathrate formation in said reactor to a coolant medium, e.g., such as those described above. By substantially all is meant at least about 95%, such as at least about 98%, including at least about 99% or more. In such embodiments, the hydrate formation reaction may be a convectively cooled tubular reactor, having a length to diameter ratio (UD) that provides for the desired heat transfer surface area, where in representative embodiments the L/D ratio ranges from about 500 to about 2000.

The clathrate formation conditions under which the gaseous and liquid phase streams are contacted, particularly the temperature and pressure, may vary but will preferably be selected so as to provide for the selective formation of $CO_2$ clathrates, limiting the clathrate formation of other components of the multi-component gaseous stream. In certain embodiments of interest, the temperature at which the gaseous and liquid phases are contacted will range from about 30 to about 100° F., such as from about 35 to about 80° F., including from about 40 to about 60° F. The total pressure of the environment in which contact occurs, e.g., in the reactor in which contact occurs, may range from about 1 to about 25 atm, including from about 2 to about 10 atm, such as from about 2 to about 8 atm. The $CO_2$ partial pressure at which contact occurs generally does not exceed about 1.0 atm, and usually does not exceed about 0.5 atm. The minimum $CO_2$ partial pressure at which hydrates form in the presence of $CO_2$ hydrate promoters is generally less than about 1.0 atm, usually less than about 0.8 atm and may be as low as 0.2 or 0.1 atm or lower.

Upon contact of the gaseous stream with the aqueous fluid, $CO_2$ is selectively removed from the gaseous stream and $CO_2$ hydrates are formed as the $CO_2$ reacts with the $CO_2$ nucleated water liquid phase containing $CO_2$ hydrate precursors, with or without $CO_2$ hydrate promoters. The removed $CO_2$ is concomitantly fixed as solid $CO_2$ clathrates in the liquid phase slurry. Contact between the gaseous and liquid phases results in the production of a $CO_2$ depleted multicomponent gaseous stream and a slurry of $CO_2$/promoter clathrates. In the $CO_2$ depleted multicomponent gaseous stream, the $CO_2$ concentration is reduced by at least about 50%, usually by at least about 70%, and more usually by at least about 90%, as compared to the untreated multicomponent gaseous stream. In other words, contact of the multicomponent gaseous stream with the $CO_2$/promoter nucleated water results in at least a decrease in the concentration of the $CO_2$ of the gaseous phase, where the decrease will be at least about 50%, usually at least about 70%, more usually at least about 90%. In some instances the concentration of $CO_2$ in the gaseous phase may be reduced to the level where it does not exceed 5% (v/v), such that the treated gaseous stream is effectively free of $CO_2$ solute gas. As such, many embodiments of the subject methods provide for a "single-pass" efficiency of $CO_2$ removal of at least about 50%, and often at least about 75 or 90% or higher.

As discussed above, the $CO_2$ removed from the multicomponent gaseous stream is concomitantly fixed in the form of stable $CO_2$ clathrates. Fixation of the $CO_2$ in the form of stable $CO_2$ clathrates results in the conversion of the aqueous fluid to a slurry of $CO_2$ clathrates. The slurry of $CO_2$ clathrates produced upon contact of the gaseous stream with the aqueous fluid comprises $CO_2$ stably fixed in the form of $CO_2$ clathrates and water. Typical mole fractions of $CO_2$ in stable, mixed clathrates are 0.05 to 0.10.

The product of the above hydrate formation step is a $CO_2$ clathrate slurry and a $CO_2$ depleted multicomponent gaseous stream, as described above. These two products, as desired, are separated from each other. As such, methods of the subject invention also include the separation of the treated gaseous phase from the $CO_2$ clathrate slurry. As convenient, the gaseous phase may be separated from the slurry in the reactor or in a downstream gas-liquid separator. Any convenient gas-liquid phase separation means may be employed, where a number of such means are known in the art. In representative embodiments, the gas-liquid separator that is employed is a horizontal separator with one or more, usually a plurality of, gas off takes on the top of the separator. The subject invention provides for extremely high recovery rates of the multicomponent gaseous stream. In other words, the amount of non-$CO_2$ gases removed from the multicomponent gaseous stream following selective $CO_2$ extraction according to the subject invention are extremely low. For example, where the multicomponent gaseous stream is a powerplant flue gas stream, the amount of gases (i.e. $N_2$, $O_2$) recovered is above 85.0%, usually above 90.0% and more usually above 95.0%, where the amount recovered ranges in many embodiments from about 85.0 to 99.0%.

Separation of the slurry and gaseous products of the hydrate formation reactor produces separate slurry and gaseous product streams, each at low pressure, where by low pressure is meant a pressure ranging from about 1 to about 10 atm, such as from about 2 to 8 atm. In certain representative embodiments, compression energy is then recovered from the gaseous product stream. Compression energy may be recovered from the gaseous product using any convenient protocol, such as by passing the gas through a gas expansion turbine. Such embodiments provide significant benefits with respect to reducing overall net compression energy requirements of the process while permitting higher working fluid compression ratios, which in turn provide for more efficient $CO_2$ clathrate separation.

A feature of the subject invention is that the product $CO_2$ clathrate slurry is then compressed using a liquid or slurry pump (as opposed to a gas compressor) to raise the pressure of the $CO_2$ clathrate slurry from a first to a second pressure (that is higher than the first pressure) and produce a high-pressure $CO_2$ clathrate product. The first pressure, as indicated above, ranges from about 1 to about 10 atm, such as from about 2 to 8 atm. As reviewed above, the high-pressure $CO_2$ product is a product having a pressure that is at least about ten times higher, and sometimes at least about 20-fold higher or at least about 30-fold higher, or even higher than the pressure at which the $CO_2$ separation from the multicomponent gaseous stream occurred. In representative embodiments, the second pressure ranges from about 20 to about 100 atm, such as from about 25 to about 75 atm, including from about 40 to about 60 atm. Any convenient liquid or slurry pump may be employed in this step of the subject methods, where the pump may be made of one or a plurality, e.g., two or more, individual pumps or pump elements, e.g., slurry pumps, etc.

Where desired, high-pressure $CO_2$ gas can easily be regenerated from the $CO_2$/promoter mixed clathrates, e.g., where high pressure $CO_2$ gas is to be a product or further processed for sequestration, using known methods. The resultant $CO_2$ gas may be disposed of by transport to the deep ocean or ground aquifers, or used in a variety of processes, e.g., enhanced oil recovery, coal bed methane recovery, or further processed to form metal carbonates, e.g., $MgCO_3$, for fixation and sequestration.

In certain embodiments, the $CO_2$ hydrate slurry is treated in a manner sufficient to decompose the hydrate slurry into high pressure $CO_2$ gas and high pressure mixed promoter/$CO_2$ nucleated water stream, i.e., it is subjected to a decomposition step. Typically, the $CO_2$ hydrate slurry is thermally treated, e.g., flashed, where by thermally treated is meant that temperature of the $CO_2$ hydrate slurry is raised in sufficient magnitude to decompose the hydrates and produce $CO_2$ gas. Typically, the temperature of the $CO_2$ hydrate slurry is raised to a temperature of between about 65 to 105° F., at a pressure ranging from about 40 to about 60 atm. One convenient means of thermally treating the $CO_2$ hydrate slurry is in a counterflow heat exchanger, where the heat exchanger comprises a heating medium in a containment means that provides for optimal surface area contact with the clathrate slurry. Any convenient heating medium may be employed, where specific heating media of interest include: ammonia, HCFC's and the like, with ammonia vapor at a temperature ranging from 20 to 40° C. being of particular interest. In certain embodiments, the ammonia vapor is that vapor produced in cooling the nucleation and/or hydrate formation reactors, as described in greater detail in terms of the figures. Where desired, the pressure of the $CO_2$ product gas may be increased to a third pressure, e.g., ranging from about 100 to about 150 atm, using any convenient means, e.g., a gas compressor.

The above described separation step results in the production of a high-pressure aqueous recycle stream containing dissolved promoters and $CO_2$, such that it is a promoter laden stream. In certain embodiments, compression energy is recovered from this high-pressure aqueous byproduct, e.g., by use of a pressure recovery turbine. The aqueous byproduct containing promoter and dissolved $CO_2$ may also be recycled to the hydrate formation reactor, where it is employed therein as promoter laden nucleated water. The byproduct may be cooled, and make up water and/or promoter may be added as desired.

By controlling the clathrate formation conditions, the $CO_2$ hydrate formation precursors and promoters, nucleated water properties, and providing intimate contact between the $CO_2$ nucleated water and the multicomponent gas, the $CO_2$ separation can be controlled to provide for the selective formation of $CO_2$ clathrates, e.g., through use of highly nucleated water containing hydrate precursors and promoters, and perhaps dissolved or dispersed catalysts, which further aids the selective $CO_2$ hydrate formation from the multicomponent gaseous stream and increases $CO_2$ separation efficiency. The particular conditions which provide for the best selectivity with a particular gas can be determined empirically by those of skill in the art.

Multicomponent gaseous streams (containing $CO_2$) that may be treated according to the subject methods include both reducing, e.g., syngas, shifted syngas, natural gas, and hydrogen and the like, and oxidizing condition streams, e.g., flue gases from combustion. Particular multicomponent gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Multicomponent gaseous mediums in which the partial pressures of each of the components are suitable for selective $CO_2$ hydrate formation according to the subject invention may be treated directly without any pretreatment or processing. For those multicomponent gaseous mediums that are not readily suitable for treatment by the subject invention, e.g., in which the partial pressure of $CO_2$ is too low and/or the partial pressure of the other components are too high, may be subjected to a pretreatment or preprocessing step in order to modulate the characteristics of the gaseous medium so that is suitable for treatment by the subject method. Illustrative pretreatment or preprocessing steps include: temperature modulation, e.g., heating or cooling, decompression, compression, incorporation of additional components, e.g., $H_2S$ and other hydrate promoter gases, and the like.

Where desired, the above process may be further modified to include use of a gaseous hydrate promoter. e.g., as described in U.S. Pat. No. 6,352,576 and U.S. Pat. No. 6,797,039 the disclosures of which are herein incorporated by reference. In these embodiments, a multicomponent gaseous stream that includes an amount of a $CO_2$ hydrate promoter is subjected to the present methods. The amount of $CO_2$ hydrate promoter that is present in the multicomponent gaseous stream may be sufficient to provide for a reduction in the $CO_2$ partial pressure requirement of hydrate formation, as described in U.S. Pat. No. 6,352,576, the disclosure of which is herein incorporated by reference.

The specific amount of gaseous $CO_2$ hydrate promoter that is present in the provided multicomponent gaseous stream of this first step depends, in large part, on the nature of the multicomponent gaseous stream, the nature of the $CO_2$ hydrate promoter, and the like. Generally, the amount of $CO_2$ hydrate promoter that is present, initially, in the multicomponent gaseous stream ranges from about 1 to 5 mole percent, usually from about 1.5 to 4 mole percent and more usually from about 2 to 3 mole percent, in many embodiments.

Any convenient gaseous $CO_2$ hydrate promoter that is capable of providing the above-described reduction in $CO_2$ partial pressure requirement of hydrate formation when present in the multicomponent gaseous stream may be employed.

One type of gaseous $CO_2$ hydrate promoter is a sulfur containing compound, where specific sulfur containing compounds of interest include: $H_2S$, $SO_2$, $CS_2$ and the like. Where the $CO_2$ hydrate promoter is $H_2S$, it is generally present in the multicomponent gaseous stream in an amount ranging from about 0.3 to about 2.0 mole percent, such as from about 0.5 to about 1.5 mole percent and including from about 0.7 to about 1.1 mole percent. Where the $CO_2$ hydrate promoter is $SO_2$, it is generally present in the multicomponent gaseous stream in an amount ranging from about 0.3 to about 2.0 mole percent, such as from about 0.5 to about 1.5 mole percent and including from about 0.7 to about 1.1 mole percent.

In certain embodiments, a multicomponent gaseous stream of interest will be tested to ensure that it includes the requisite amount of $CO_2$ hydrate promoter of interest. In certain embodiments where desired, a sufficient amount of the $CO_2$ hydrate promoter is added to the multicomponent gaseous stream to be treated. The requisite amount of $CO_2$ hydrate promoter that needs to be added to a given multicomponent gaseous stream of interest necessarily varies depending on the nature of the gaseous stream, the nature of the $CO_2$ hydrate promoter, the desired $CO_2$ separation ratio and the like. The requisite amount of $CO_2$ hydrate promoter may be added to the multicomponent gaseous stream using any convenient protocol, e.g., by combining gaseous streams, adding appropriate gaseous components, etc.

Systems

As summarized above, also provided are systems for use in practicing the subject methods. A feature of the subject systems is that they include at least: (a) a hydrate formation reactor; and (b) a slurry compression element for pumping $CO_2$ clathrate slurry produced by the hydrate formation reactor.

Figure 1:
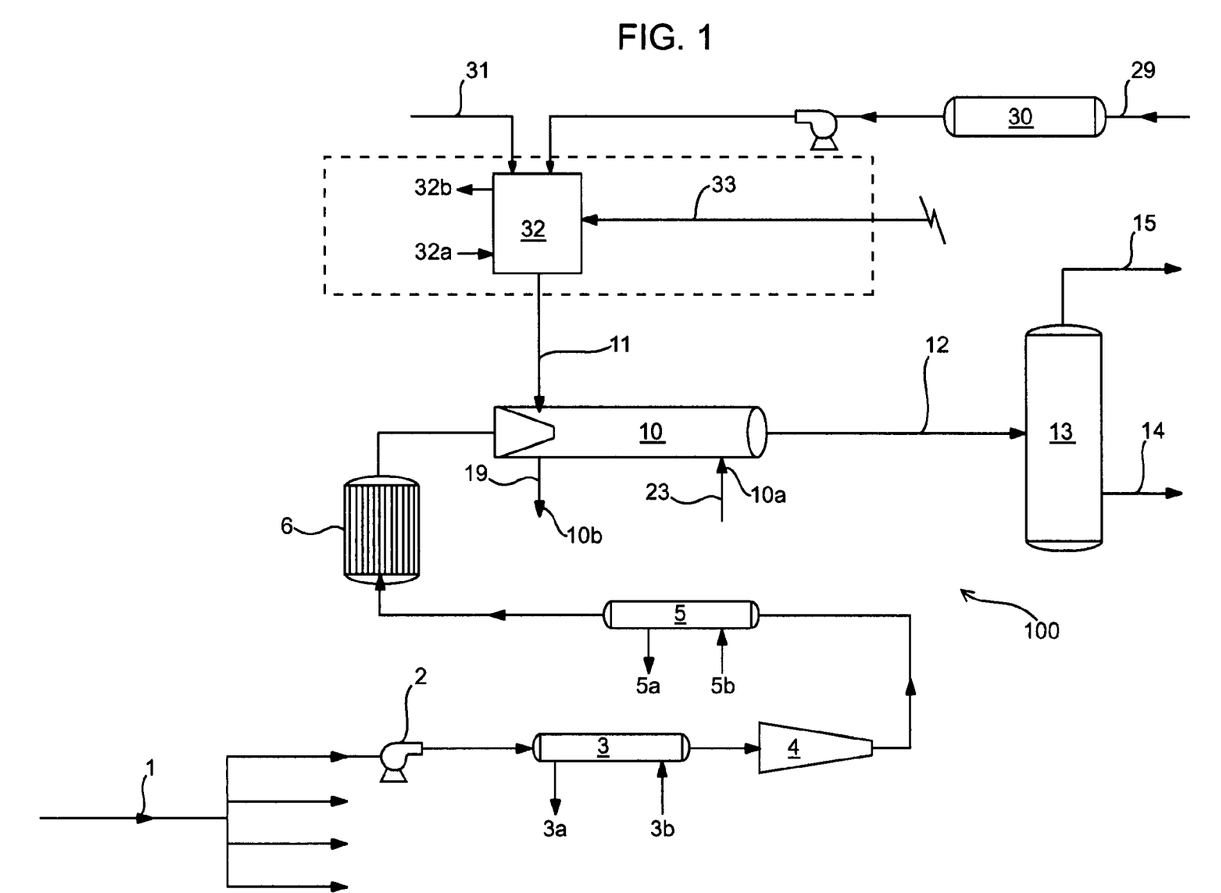
FIGS. 1 and 2 provide a schematic diagram of a system according to an embodiment of the subject invention.

The invention will now be further described in terms of representative embodiments of the subject systems. One representative embodiment of the subject systems is shown schematically in FIGS. 1 and 2. FIG. 1 provides a schematic flow diagram of a system 100 for selectively removing $CO_2$ from a multicomponent gaseous stream in a manner according to the present invention. In FIG. 1, the multicomponent gaseous stream 1, e.g., flue gas (made up of $N_2$ (60–70%), $O_2$ (5–8%), $CO_2$ (10–15%), water vapor (10–15%), argon (1%) and trace gases (e.g., sulfur dioxide, nitrogen oxides, etc.) having a temperature ranging from about 130 to about 180° F., e.g., 150° F., and a pressure of about 1 atm, is first split in four lower capacity streams, each treated in parallel as described below. Gas stream 1 is then passed through blower 2 to increase the pressure to a value between about 1.25 and 1.5 atm, e.g., about 1.33 atm. The gas is then passed through gas cooler 3 to reduce the temperature of the gas to between about 50 and about 90° F. Reference 3b shows fresh coolant arriving at cooler 3 from, e.g., a cooling tower, condenser or water source, and reference 3a shows spent coolant traveling from cooler to a coolant regenerator, e.g., a condenser or cooling tower. The resultant gas in then compressed in gas compressor 4 to a pressure ranging from about 2 to 10 atm, e.g., 2 to 8 atm, where the compressed gas may have a temperature ranging from about 180 to about 220° F., e.g., 200° F. The gas 1 may then be passed through second gas cooler 5, having inflow and outflow of coolant as indicated by 5b and 5a, respectively, to produce a product gas having a temperature between about 50 and about 90° F. and a pressure between about 2 and about 8 atm. The resultant product gas is then passed through flow splitter 6 and then into hydrate formation reactor 10, wherein it is combined with promoter laden $CO_2$ nucleated water 11 under conditions sufficient to produce a $CO_2$ hydrate slurry and a $CO_2$ depleted multicomponent gaseous stream, collectively referenced as 12. Arrow 10a shows fresh coolant traveling to reactor 10, where the fresh coolant may have a temperature ranging from about 20 to about 60° F. Arrow 10b shows spent coolant leaving reactor 10, where the spent coolant may have a temperature ranging from about 30 to about 70° F. The combined product stream of $CO_2$ hydrate slurry and other gases 12 is then separated in the low-pressure slurry/gas separator 13. Product $CO_2$ hydrate slurry has a temperature ranging from about 55 to about 85° F. and a pressure ranging from about 1 to about 6 atm. Product gas 15 also has a temperature ranging from about 55 to about 85° F. and a pressure ranging from about 1 to about 6 atm. Where desired, product gas 15 may be passed through a gas expansion turbine to recover compression energy present therein.

Figure 2:
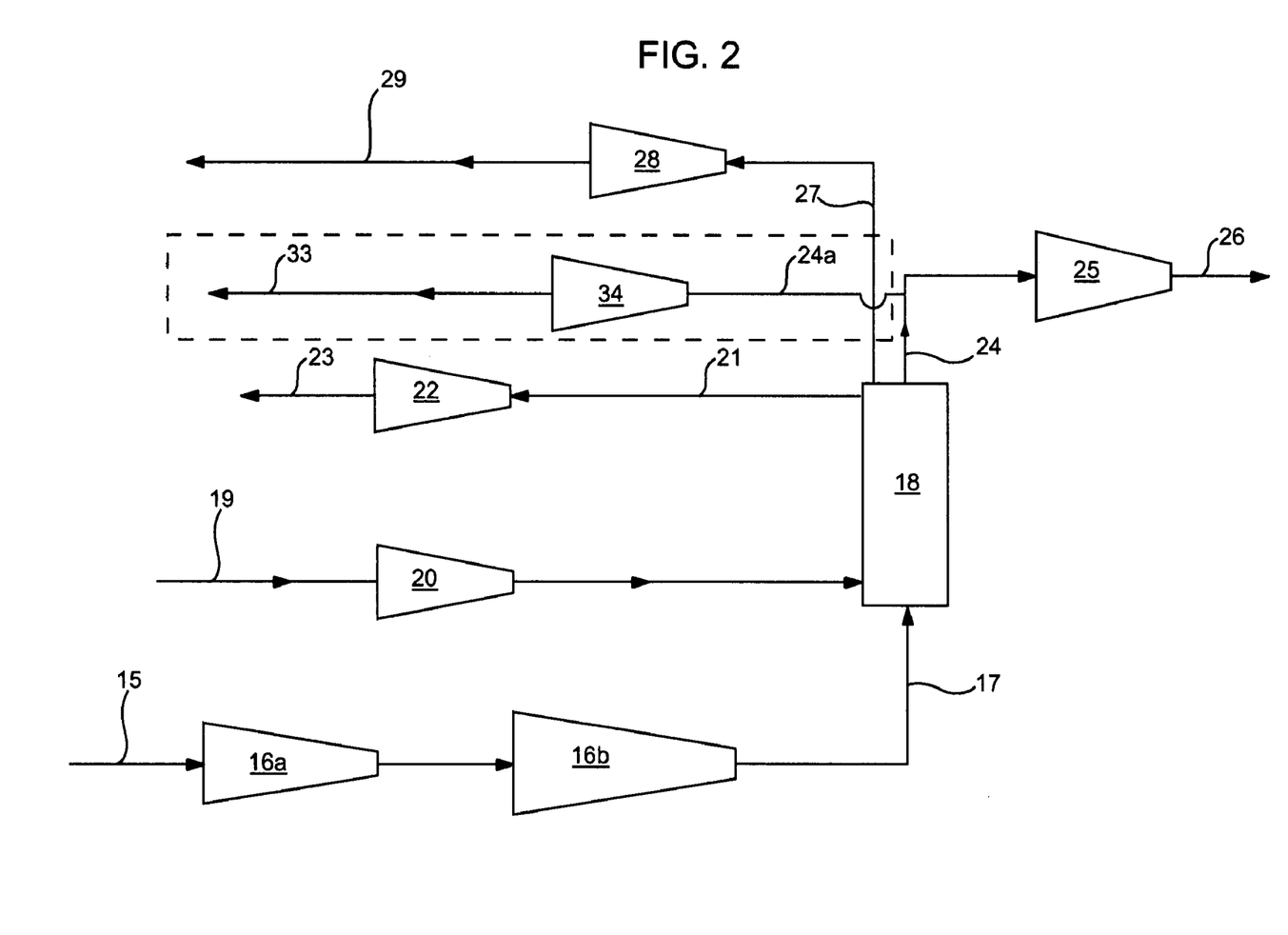

As depicted in FIG. 2, product slurry 15 is then compressed by passing the slurry through slurry pumps 16a and 16b to produce a higher pressure slurry product 17, which has a temperature ranging from about 65 to about 100° F. and a pressure ranging from about 40 to about 60 atm. High-pressure slurry product 17 is then thermally treated to produce $CO_2$ gas and nucleated water using flash reactor 18. Thermal energy is provided to flash reactor 18 by spent coolant vapor 19 from the hydrate formation reactor, which spent coolant vapor is passed through vapor compressor 20 to increase its temperature to between about 90 and about 120° F. Condensed or spent coolant 21 from flash reactor 18 is then passed through decompression turbine 22 to produce a refreshed coolant 23 having a temperature ranging from about 20 to about 60° F.

The $CO_2$ gas 24 produced by flash reactor 18 is a high pressure gas having a temperature ranging from about 65 to about 100° F. and a pressure ranging from about 40 to about 60 atm. This high-pressure gas is then passed through a single stage gas compressor 25 to produce a product gas 26 having a pressure up to about 150 atm.

High temperature aqueous byproduct 27 having a temperature ranging from about 65 to about 100° F. and a pressure ranging from about 40 to about 60 atm is then passed through pressure recovery turbine 28 to produce a product stream 29 having a temperature ranging from about 65 to about 100° F. and a pressure ranging from about 2 to about 8 atm, which product stream 29 is then returned to the hydrate formation reactor via recycle water cooler 30, as shown on FIG. 1. Also shown is addition of make up water and/or promoter 31. Optionally, as indicated by dashed lines, the system may include a nucleation reactor 32, for regenerating nucleated water 11 from aqueous byproduct 29. Nucleation reactor 32 is cooled using coolant inflow and outflow, 32a and 32b, respectively. Also shown is $CO_2$ recycle stream 33, which is produced by passing a portion 24a of product gas 24 through pressure recovery turbine 34. In certain embodiments, nucleation reactor may not be needed and therefore this portion of the depicted system is shown in dashed lines. Where the nucleation reactor 32 is not needed, aqueous byproduct 29 is cooled, combined with makeup water and/or promoter as desirable and then used directly as nucleated water 11 in reactor 10.

The subject methods and systems provide for the resource efficient production of a high pressure $CO_2$ clathrate slurry from an initially low pressure $CO_2$ separation reactor. The subject methods and systems provide for numerous opportunities to reduce parasitic energy loss, and efficiently provide for separation of $CO_2$ from a multicomponent stream to produce a high pressure $CO_2$ product gas. As such, the subject invention represents a significant contribution to the art.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for removing $CO_2$ from a multicomponent gaseous stream to produce a $CO_2$ depleted gaseous stream and a high pressure $CO_2$ product, said method comprising:
   (a) contacting a multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ clathrate slurry;
   (b) separating said $CO_2$ depleted gaseous stream from said $CO_2$ clathrate slurry to remove $CO_2$ from said multicomponent gaseous stream; and
   (c) compressing said $CO_2$ clathrate slurry at a first pressure to a second pressure that is higher than said first pressure to produce said high-pressure $CO_2$ clathrate slurry product, wherein said second pressure is at least about 10 times higher than said first pressure.

2. The method according to claim 1, wherein said second pressure ranges from about 20 to about 100 atm.

3. The method according to claim 1, wherein said first pressure ranges from about 0.5 to about 10 atm.

4. The method according to claim 1, wherein said aqueous fluid is $CO_2$ nucleated water.

5. The method according to claim 4, wherein said aqueous fluid of said contacting step comprises a $CO_2$ hydrate promoter.

6. The method according to claim 5, wherein said $CO_2$ hydrate promoter is a low molecular weight compound.

7. The method according to claim 6, wherein said low molecular weight compound is an organic salt.

8. The method according to claim 7, wherein said organic salt is an alkyl-onium salt.

9. The method according to claim 1, wherein said contacting step occurs in a reactor having a heat transfer surface area sufficient to transfer substantially all of said heat of formation energy produced by clathrate formation in said reactor to a coolant medium.

10. The method according to claim 9, wherein said reactor has a length to diameter ratio (L/D) that ranges from about 500 to about 2000.

11. The method according to claim 1, wherein said separating step (b) occurs in a low-pressure liquid/gas separator.

12. A method for removing $CO_2$ from a multicomponent gaseous stream to produce a $CO_2$ depleted gaseous stream and a high pressure $CO_2$ product, said method comprising:
   (a) contacting a multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ clathrate slurry;
   (b) separating said $CO_2$ depleted gaseous stream from said $CO_2$ clathrate slurry to remove $CO_2$ from said multicomponent gaseous stream; and
   (c) compressing said $CO_2$ clathrate slurry at a first pressure to a second pressure that is higher than said first pressure to produce said high-pressure $CO_2$ clathrate slurry product, wherein said method further comprises recovering compression energy from said $CO_2$ depleted gaseous stream produced by said separating step (b) and wherein said separating step (b) occurs in a low-pressure liquid/gas separator.

13. The method according to claim 1, wherein said method further comprises reducing the temperature and increasing the pressure of said multicomponent gaseous stream prior to said contacting step (a).

14. The method according to claim 1, wherein said method further comprises producing $CO_2$ gas from said high-pressure $CO_2$ product.

15. A method for removing $CO_2$ from a multicomponent gaseous stream to produce a $CO_2$ depleted gaseous stream and a high pressure $CO_2$ product, said method comprising:
   (a) contacting a multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ cladhrate slurry;
   (b) separating said $CO_2$ depleted gaseous stream from said $CO_2$ clathrate slurry to remove $CO_2$ from said multicomponent gaseous stream; and
   (c) compressing or pumping said $CO_2$ clathrate slurry at a first pressure to a second pressure that is higher than said first pressure to produce said high-pressure $CO_2$ clathrate slurry product,
   wherein said method further comprises producing $CO_2$ gas from said high-pressure $CO_2$ product and wherein heat of formation energy obtained from said contacting step (a) is employed to produce $CO_2$ gas from said high-pressure $CO_2$ product.

16. The method according to claim 15, wherein said $CO_2$ gas is produced from said high-pressure $CO_2$ product by flashing said high pressure $CO_2$ product.

17. The method according to claim 14, wherein said method further comprises compressing said $CO_2$ gas to a third pressure that is higher than said second pressure.

18. The method according to claim 17, wherein said third pressure ranges from about 100 to about 150 atm.

19. The method according to claim 14, wherein said $CO_2$ producing step also produces an aqueous byproduct that is recycled for use in further $CO_2$ hydrate formation.

20. A method for removing $CO_2$ from a multicomponent gaseous stream to produce a $CO_2$ depleted gaseous stream and a high pressure $CO_2$ product, said method comprising:
   (a) contacting a multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ clathrate slurry;
   (b) separating said $CO_2$ depleted gaseous stream from said $CO_2$ clathrate slurry to remove $CO_2$ from said multicomponent gaseous stream; and
   (c) compressing or pumping said $CO_2$ clathrate slurry at a first pressure to a second pressure that is higher than said first pressure to produce said high-pressure $CO_2$ clathrate slurry product.
   wherein said method further comprises producing $CO_2$ gas from said high-pressure $CO_2$ product; wherein said $CO_2$ gas producing step also produces an aqueous byproduct that is recycled for use in further $CO_2$ hydrate formation; and wherein said method comprises recovering compression energy from said aqueous byproduct.

21. A method for removing $CO_2$ from a multicomponent gaseous stream to produce a $CO_2$ depleted gaseous stream and a high pressure $CO_2$ product, said method comprising:
   (a) contacting a multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ clathrate slurry;
   (b) separating said $CO_2$ depleted gaseous stream from said $CO_2$ clathrate slurry to remove $CO_2$ from said multicomponent gaseous stream; and
   (c) compressing said $CO_2$ clathrate slurry at a first pressure to a second pressure that is higher than said first pressure to produce said high-pressure $CO_2$ clathrate slurry product;
   (d) decomposing said high-pressure clathrate slurry product to produce $CO_2$ product gas; and
   (e) increasing the pressure of the $CO_2$ product gas to a third pressure that is higher than said second pressure.

* * * * *